(12) United States Patent
Yang

(10) Patent No.: US 11,089,609 B2
(45) Date of Patent: *Aug. 10, 2021

(54) SMART RADIO ARBITER WITH CONFLICT RESOLUTION BASED ON TIMING PREDICTABILITY

(71) Applicant: Microchip Technology Incorporated, Chandler, AZ (US)

(72) Inventor: Yifeng Yang, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,240

(22) Filed: Jan. 31, 2020

(65) Prior Publication Data

US 2020/0170025 A1    May 28, 2020

Related U.S. Application Data

(63) Continuation of application No. 16/037,599, filed on Jul. 17, 2018, now Pat. No. 10,652,912.

(60) Provisional application No. 62/664,828, filed on Apr. 30, 2018.

(51) Int. Cl.
| | |
|---|---|
| *H04W 4/00* | (2018.01) |
| *H04W 72/12* | (2009.01) |
| *H04W 74/04* | (2009.01) |
| *H04W 88/06* | (2009.01) |

(52) U.S. Cl.
CPC ....... *H04W 72/1215* (2013.01); *H04W 74/04* (2013.01); *H04W 72/12* (2013.01); *H04W 88/06* (2013.01)

(58) Field of Classification Search
CPC . H04W 72/1215; H04W 74/04; H04W 72/12; H04W 88/06
See application file for complete search history.

(56) References Cited

U.S. PATENT DOCUMENTS

| | | |
|---|---|---|
| 7,546,404 B2 | 6/2009 | Yeh et al. |
| 7,924,795 B2 | 4/2011 | Wan et al. |
| 8,848,676 B1 | 9/2014 | Wheeler et al. |
| 9,893,758 B2 | 2/2018 | Homchaudhuri et al. |

(Continued)

FOREIGN PATENT DOCUMENTS

| | | |
|---|---|---|
| CN | 101989942 A | 3/2011 |
| CN | 102792767 A | 11/2012 |

OTHER PUBLICATIONS

IEEE Standard for Local and metropolitan area networks—Part 15.4: Low-Rate Wireless Personal Area Networks (LR-WPANs), IEEE Computer Society, IEEE Std 802.15.4-2011, Sep. 5, 2011, 314 pages.

(Continued)

*Primary Examiner* — Abdelnabi O Musa
(74) *Attorney, Agent, or Firm* — TraskBritt

(57) ABSTRACT

A radio arbitrator, electronic system, and method for wireless communication are disclosed in which at least two RF requests are received through a single radio module. The radio arbitrator performs predictive arbitration based on timing information of connection events to maintain a wireless connection, which is known prior to receiving RF requests including the connection events. Rf requests may be based on one or more of ZIGBEE®, Bluetooth® Low Energy, or Wi-Fi communication topologies.

20 Claims, 9 Drawing Sheets

(56) References Cited

U.S. PATENT DOCUMENTS

| | | |
|---|---|---|
| 2004/0177188 A1 | 9/2004 | Yoon |
| 2009/0081962 A1 | 3/2009 | Sohrabi |
| 2009/0147763 A1 | 6/2009 | Desai et al. |
| 2010/0069112 A1 | 3/2010 | Sun et al. |
| 2011/0153839 A1* | 6/2011 | Rajan .................. H04L 69/16 709/227 |
| 2011/0207490 A1 | 8/2011 | Lee et al. |
| 2012/0020348 A1 | 1/2012 | Haverinen et al. |
| 2012/0046000 A1 | 2/2012 | Gao et al. |
| 2013/0073763 A1* | 3/2013 | Hu .................... G11C 7/1075 710/113 |
| 2013/0111253 A1 | 5/2013 | Lewis |
| 2015/0110087 A1* | 4/2015 | Salkintzis ............ H04W 36/26 370/338 |
| 2015/0181469 A1 | 6/2015 | Yu et al. |
| 2016/0150589 A1* | 5/2016 | Zhao .................. H04L 67/14 370/328 |
| 2017/0208623 A1* | 7/2017 | Bate ................ H04W 72/1215 |

OTHER PUBLICATIONS

International Search Report for International Application No. PCT/US2019/027712, dated Jun. 25, 2019, 5 pages.
International Written Opinion for International Application No. PCT/US2019/027712 dated Jun. 25, 2019, 8 pages.
Chinese Office Action and Search Report from Chinese Application No. 201980029582.7, dated Mar. 15, 2021, 12 pages.

* cited by examiner

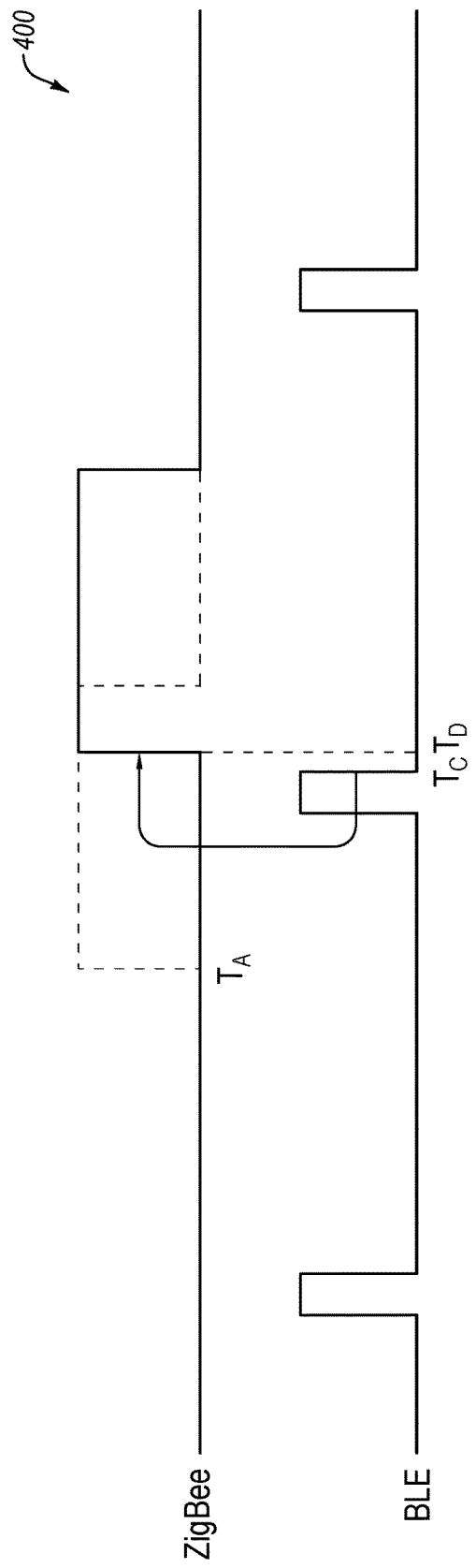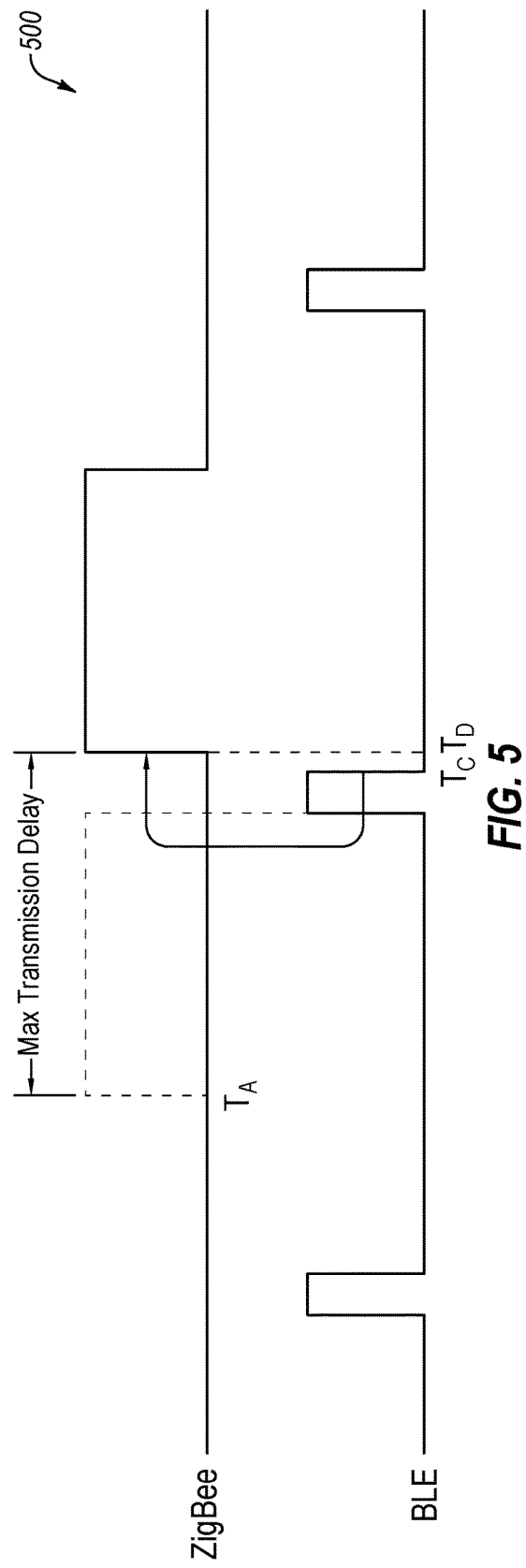

SMART RADIO ARBITER WITH CONFLICT RESOLUTION BASED ON TIMING PREDICTABILITY

CROSS-REFERENCE TO RELATED APPLICATION

This application is a continuation of U.S. patent application Ser. No. 16/037,599, filed Jul. 17, 2018 now U.S. Pat. No. 10,652,912, issued May 12, 2020, and also claims the benefit under 35 U.S.C. § 119(e) of U.S. Provisional Patent Application Ser. No. 62/664,828, filed Apr. 30, 2018, the disclosure of each of which is hereby incorporated herein in its entirety by this reference.

TECHNICAL FIELD

The present disclosure relates, generally, to wireless communication and, more particularly, to a wireless subsystem that supports different links with a single radio frequency (RF) radio.

BACKGROUND

When wireless subsystems operating with different protocols share a common communication channel (e.g., wireless radio-frequency (RF) bands), additional procedures may be desirable to arbitrate packet traffics within the wireless subsystem. According to predefined standards, multiple communication modules may operate at the same (or overlapping) frequency band. As a result, physical interferences may be induced therebetween. In an 802.11 and 802.15 dual radio system, a conventional technique to mitigate the physical interference encountered between the WLAN module and Bluetooth® module is IEEE 802.15.2 Packet Traffic Arbitration (PTA). The PTA mechanism is a priority based control system including an arbitration circuit coupled to the WLAN module and Bluetooth® module, and configured to enable either module to perform RF activity. The arbitration may be based on a priority table defining priorities of the different traffic types. A request of a traffic type of the highest priority may be unconditionally granted, while a traffic type of a lower priority may only granted when the higher priority traffic is inactive.

BRIEF SUMMARY

In some embodiments, a radio arbiter comprises a processor and a computer-readable medium. The computer-readable medium includes instructions stored thereon that, when executed by the processor, cause the processor to receive a first RF request associated with a first low power wireless protocol, receive a second RF request associated with a second low power wireless protocol, and place the first RF request on hold until after the second RF request is completed based on a predictive arbitration determination before receiving the second RF request.

In some embodiments, an electronic system comprises a wireless subsystem including a radio module, a plurality of link controllers configured according to different topologies, and a radio arbiter. The radio arbiter is configured to transmit and receive data between the radio module and the plurality of link controllers, and place a first RF request on hold until after a second RF request is completed based on a predictive arbitration determination before receiving the second RF request.

In some embodiments, a method of wireless communication comprises receiving a first RF request through a radio module having a first priority, receiving a second RF request through the radio module having a second priority higher than the first priority, and placing the first RF request on hold responsive to determining that granting the first RF request would result in a collision with the second RF request.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

FIG. 4 is a timing diagram showing operation of a predictability-based radio arbiter.

FIG. 5 is a timing diagram showing a maximum transmission delay of a prediction-based arbitration event according to an embodiment of the disclosure.

DETAILED DESCRIPTION

Figure 1:
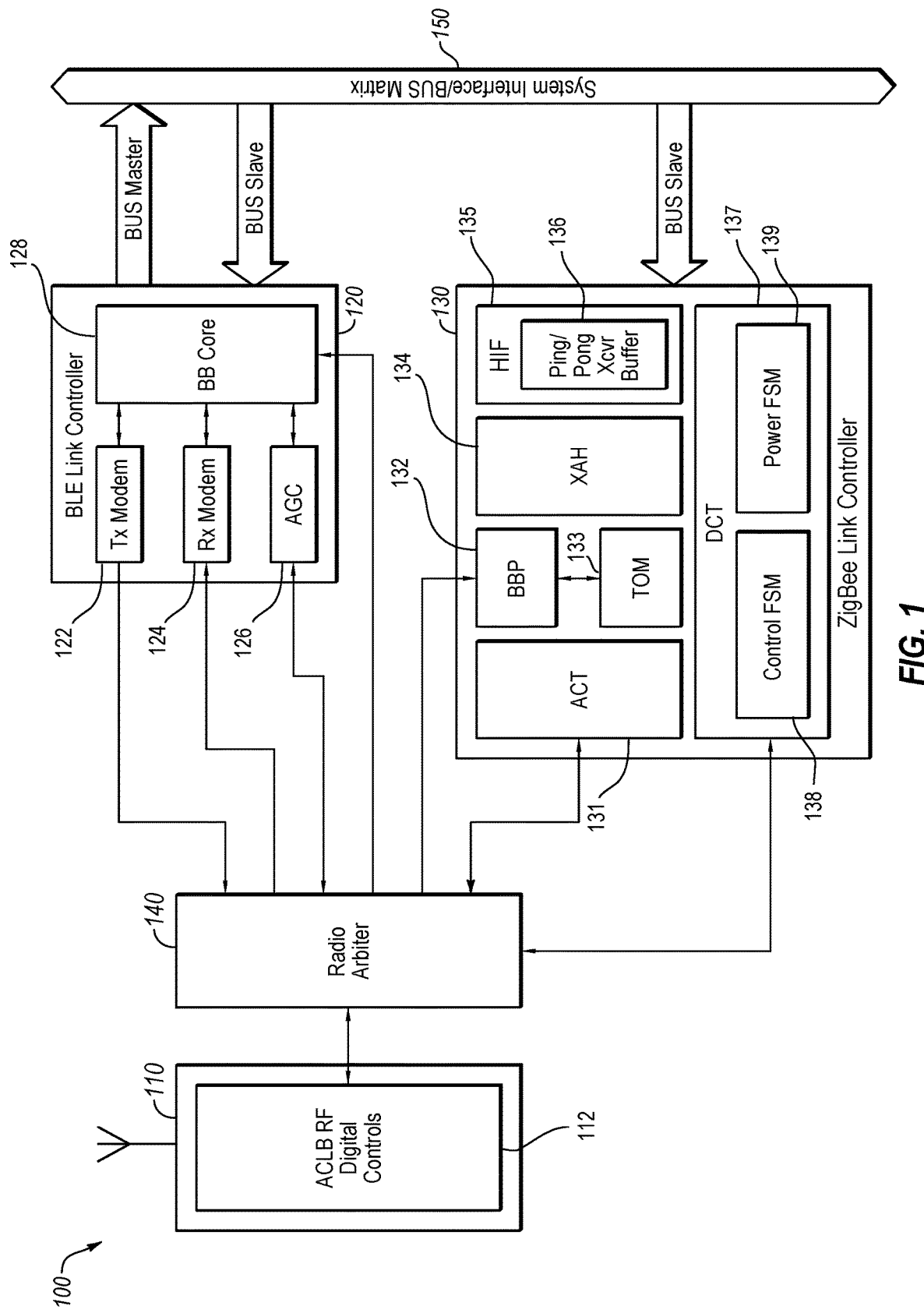
FIG. 1 is a simplified block diagram of a wireless subsystem according to embodiments of the present disclosure.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

Embodiments include a radio arbiter configured to arbitrate the ownership of the RF radio link between at least two different link controllers for at least two different radio protocols (e.g., ZIGBEE® and Bluetooth®). Because both links do not need to utilize 100% of the radio on-air time, the radio arbiter shares the on-air time of the radio between the two link controllers by intelligently switching the ownership between the two based on the priorities of their individual requests. The base priorities of the individual requests may be modified using programmed incremental priorities based on the status of the sub-tasks for each of the request. The incremental priorities of the sub-tasks may increase the efficiency of the radio utilization between the two links by avoiding the termination of tasks based on the sub-state. The hardware scheme provides programmable sub-tasks priorities into categories: incremental, decremental and absolute.

As used in this disclosure, "wireless communication link" means a physical communication channel between two devices where the physical medium of communication is primarily radio-frequency (RF) waves. For example, a channel of a wireless communication link may be a frequency-specific communication path between the two devices. A channel may be part of a frequency spectrum allocated for communication that is comprised of many possible channels. A wireless communication link may actually use multiple channels within a frequency spectrum during communication between two devices, for example, using techniques such as frequency hopping and adaptive frequency hopping. A wireless communication link may be one-way (e.g., a device has a transmitter, but no receiver or is not configured to receive messages, so the link is unidirectional), and two-way (e.g., equipment to both send and receive). As used in this disclosure, "Communication message(s)" means the administrative messages (e.g., for setup of a wireless communication link) and the information messages (e.g., data payload) sent over a wireless communication link as one or more packages.

As used herein, "collision" means that for a given time there are two or more wireless communication transmissions using the same or at least partially overlapping radio frequency bands.

Embodiments of the disclosure may include the radio arbiter handling two or more short-link RF topologies. The first RF topology may be configured according to a low power, low rate wireless personal area network. As a non-limiting example, the first RF topology may operate according to the IEEE 802.15.4 technical standard. Examples of such include ZIGBEE®, ISA100.11a, WirelessHART, WiWi, SNAP, and Thread specifications. The second RF topology may be configured according to another low power, low rate wireless personal area network, such as Bluetooth® (e.g., Bluetooth® Low Energy (BLE)), ANT, ANT+, etc. Additional embodiments may also include Wi-Fi topologies. While embodiments of the disclosure are primarily described as providing arbitration between two controllers coupled to a single RF antenna, providing arbitration for more than two controllers and topologies is also specifically contemplated. In addition, ZIGBEE® and Bluetooth® may be provided as non-limiting examples for convenience of discussion; however, other topologies and combinations of topologies are also contemplated. While most examples discuss a radio arbiter that handles two different topologies, embodiments of the disclosure may include more than two different types of RF requests. As a result, the radio arbiter may manage requests with three, four, etc. types of RF requests and predict collisions among each of the different requests. Determining the order for which RF requests are serviced and/or placed on hold may depend on the different priorities set for each of the three or more different topologies.

Embodiments of the disclosure may also include devices and methods for scheduling communication involving at least two wireless protocol types. The method comprises receiving a first RF request of a first type and a second RF of a second type, predicting a collision between the first RF request and the second RF request based on one or more parameters of the requests, and scheduling grant of the first RF request and the second RF request based on a priority level to avoid the predicted collision.

FIG. 1 is simplified block diagram of a wireless subsystem 100 according to embodiments of the present disclosure. The elements may be implemented by analog circuitry, digital circuitry, instructions for execution by a processor, or any suitable combination thereof. The wireless subsystem 100 may include a radio module 110 operably coupled to a plurality of RF link controllers 120, 130, through a radio arbiter 140. ACLB (Analog Control Logic Block) 112 embedded within the radio module 110 may provide one or more functions for the radio module 110, and include components configured for complex analog filtering and sampling, such as antennas, mixers, analog-to-digital converters, filters, modems, etc., as known by one having ordinary skill in the art. The link controllers 120, 130 also communicate to the larger electronic system (not shown) through a system interface 150. The wireless subsystem 100 may be incorporated within larger systems and devices, such as home automation devices, medical devices, smartphones, gaming consoles, personal computers, laptop computers, tablet computers, automotive devices, audio systems (e.g., headphones, headsets, stereo systems, portable speakers, etc.), video systems, peripheral devices (e.g., printers), and other systems with low power, low-bandwidth needs for short range data transfer.

As discussed above, the first link controller 120 may be a Bluetooth® (BLE) link controller and the second link controller 130 may be a Zigbee (ZIGBEE®) link controller. Different types of link controllers (e.g., Wi-Fi) are also contemplated, and the number of different types of link controllers may also be greater than two (e.g., three or more) that the radio arbiter 140 supports. The link controllers 120, 130 may have similar interfaces with the corresponding firmware (FW) stacks. A dual-buffer interface instead of single transceiver buffer may be used in the second link controller 130. A parallel system bus interface may be used. Tx and Rx activity events interrupts may be generated by the corresponding link controllers 120, 130. The radio arbiter 140 may generate additional interrupts related to arbitration exceptions and events.

The BLE link controller 120 may include functional modules such as a Tx modem 122, Rx modem 124, automatic gain control (AGC) 126, and baseband core 128 and/or other elements necessary to handle BLE communication. The ZIGBEE® Link Controller 130 may also include functional modules such as ACT 131, baseband processor (BBP) 132, TOM 133, XAH 134, host interface (HIF) 135 (including a transceiver buffer 136), and DCT control module 137 (including a control finite state machine (FSM) 138 and power FSM 139) and/or other elements necessary for the BLE link controller 120 to handle the ZIGBEE® communication.

In various embodiments, the radio arbiter 140 may be configured to perform a flexible arbitration scheme for handling communication between a single radio module 110 and the different link controllers 120, 130. The arbiter interfaces with the radio module 110 on one end and with the link controllers 120, 130 at the other end. The radio arbiter 140 may be configured to determine the ownership of the radio module 110 between link controllers 120, 130 and ensures that the corresponding current owner drives the controls to the radio module 110.

The arbitration scheme may include modes such as Bluetooth® Low Energy (BLE) static, Zigbee (ZIGBEE®) static, or dynamic. In BLE static mode, the radio ownership is with BLE link controller 120. In ZIGBEE® static mode, radio ownership is with ZIGBEE® link controller 130. In dynamic mode, radio ownership decided dynamically at every arbitration event. At any time, the radio arbiter 140 may be configured in either BLE static mode or ZIGBEE® static mode. In these modes, no arbitration is done and the radio module 110 is owned by either link controller 120, 130. During the dynamic mode, the link controllers 120, 130 each assign a priority for an RF request to the radio arbiter 140, and the radio arbiter 140 switches between RF requests of the two protocol modules based on the assigned priority. As discussed further below, the conflict resolution performed by the radio arbiter 140 may also consider the timing predictability of the different RF requests when performing the arbitration.

Figure 2:
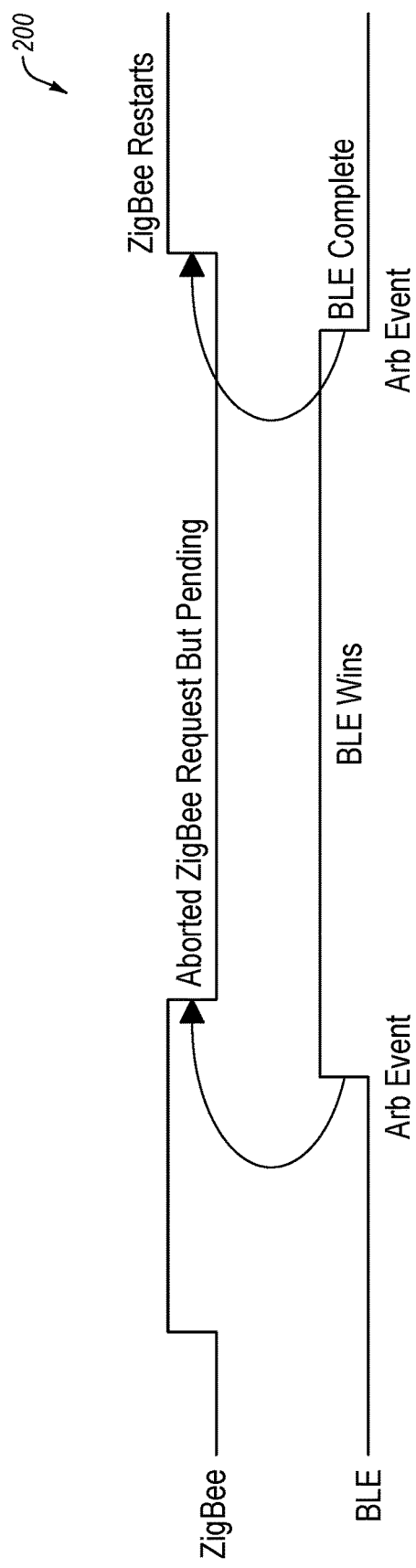
FIG. 2 is a timing diagram showing a radio arbiter operation without the predictive timing aspects of the disclosure.

FIG. 2 is a timing diagram 200 showing a radio arbiter operation without the predictive timing aspects of the disclosure. As discussed above, the radio arbiter coordinates RF operations on two or more separate controller implementations. When multiple operations are competing with limited resources, each operation is assigned a priority level. A higher priority operation could interrupt the lower priority one, so the limited resource could serve multiple operations based on the urgency of the needs. Once a wireless communication event is interrupted, the message is not transmitted. As an example in FIG. 2, a higher priority BLE request may interrupt a lower priority pending ZIGBEE® operation. As a result, the ZIGBEE® communication is aborted by the radio arbiter and the BLE communication is handled until completion, after which the ZIGBEE® communication restarts. In the middle of ZIGBEE® communication, there is no way such RF operation could continue after the higher priority RF request is finished. Because the RF operation is not finished, the message is considered not sent over the air. As a result, the energy used to transmit data prior to the interruption has been wasted. Furthermore, the failed transmission occupied the airwave; therefore, prevented any other device to use the frequency channel. Such lose-lose situation should be avoided whenever possible.

Because characteristics of BLE and ZIGBEE® protocols (and other similar protocols) are predictable, the radio arbiter according to embodiments of the disclosure that is configured to handle RF requests from two protocols may be configured to take into account timing predictability of the RF requests. BLE and other Time Division Multiple Access (TDMA) and dynamic TDMA protocols, and so the BLE module's behavior is highly predictable.

Under a connected state, the central and peripheral devices communicate with fixed connection interval. When issuing the current RF request for a connection event, the BLE module knows to a great degree of accuracy that the next BLE connection event will happen after a connection interval.

Under a non-connected advertisement state, the peripheral (e.g., a broadcaster such as a Bluetooth® beacon) advertises at a fixed interval. In one embodiment, the random delay of an advertisement may be evaluated beforehand and added to an advertisement interval parameter. Therefore, when issuing the current BLE request, the BLE module also knows to a great degree of accuracy when the next advertisement event will happen.

Under a non-connected scan state, when starting the current scan request, the observer knows that the next scan RF request will be issued after a scan interval. It also knows the current RF request will last for a time period of a scan window.

A protocol under IEEE 802.15.4 (e.g., ZIGBEE®) may operate as TDMA system under Guaranteed Time Slot (GTS) mode or random access mode. When operating under random access mode only, the start of a ZIGBEE® RF request is not known, but the duration of the current RF request, and how long it will last, is known. As an example, assuming a payload of X (X<=127) bytes, the total transmission time may be (8(CCA)+12(preamble+PHY_header)+X*2) symbols. If acknowledgement is required, additional 54 symbols will be added to handle acknowledgement. With 2.4 GHz O-QPSK modulation, one symbol is 16 microseconds. There may be another fixed processing time (such as Tx-Rx turn over) added based on the silicon design.

Figure 3:
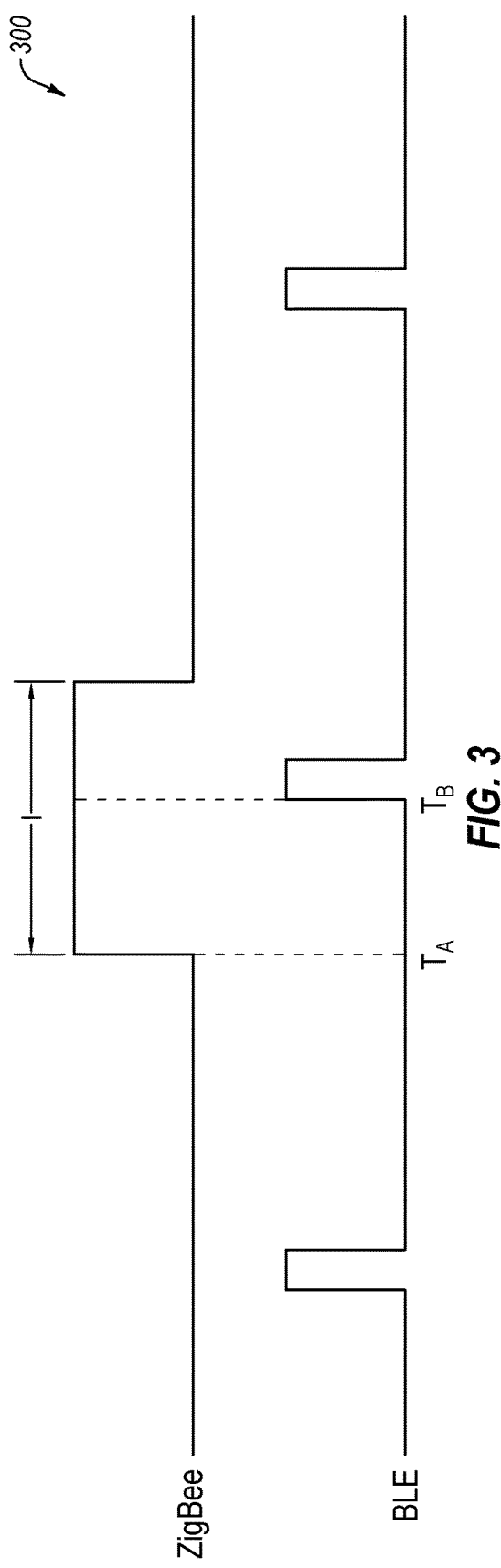
FIG. 3 is a timing diagram showing operation of a priority-based radio arbiter.

FIGS. 3 and 4 are timing diagrams 300, 400 showing a comparison of operation of a priority-based radio arbiter (FIG. 3) and a predictability-based radio arbiter (FIG. 4). In FIG. 3, there is an active BLE link with a fixed connection interval. The ZIGBEE® module tries to send a packet that lasts time t, starting at $T_A$. However, there is a scheduled BLE communication at $T_B$, where $(T_B-T_A)<t$. If ZIGBEE® packet transmission starts at $T_A$, the ZIGBEE® packet may collide with the BLE RF request at $T_B$, therefore, the ZIGBEE® packet would not be able to finish transmission because of the priority of the BLE communication. As a result, the BLE request may interrupt the ZIGBEE® transmission and start BLE communication at $T_B$, therefore, wasted the Tx energy between $T_A$ and $T_B$ as well as occupied the airways between $T_A$ and $T_B$ without any substantial positive effect.

Referring now to FIG. 4, the radio arbiter is configured to utilize known information about the requests to predict that there may be a conflict at $T_B$. As a result, the radio arbiter holds the ZIGBEE® transmission that would have otherwise begun at $T_A$ until after the scheduled BLE communication ends at $T_C$. The radio arbiter then starts transmission of the ZIGBEE® packet at $T_D$ where ($T_D$-$T_C$) may be short depending on silicon design. In addition, the packet latency for the ZIGBEE® communication may not be increased.

To summarize, the radio arbiter may be configured to: at $T_A$, predict whether the current ZIGBEE® request will collide in the future with pending RF request at $T_B$; at $T_A$, reject the current ZIGBEE® request; at $T_B$, serve the BLE request as expected; and at $T_C$, start ZIGBEE® request after the BLE request is cleared. To enable such smartness and predictability, in addition to the inputs to the radio arbiter defined above, additional parameters may be used by the radio arbiter: RF request type, the expected duration of current RF request, the time to the next pending RF request, and the priority of the next pending RF request. As discussed above, the expected duration of the current RF request may be predictable for both BLE (fixed) and ZIGBEE® (depending on the size of transmitting packets).

As the BLE protocol is a TDMA and its RF activity is highly predictable, the time to the next pending RF request is known to the BLE module when it submits a request for the current one. When ZIGBEE® acts in random access mode, the next pending RF request is unknown, therefore, the radio arbiter may input 0 to indicate an unknown pending request. The next-pending-request-timing predictability on one protocol may be enough to enable RF request operation free of transmission interrupt between two protocols.

Under BLE operations for certain applications (e.g., streaming data), the RF requests to transmit data may be one immediately after the other. In this situation, the priority of ZIGBEE® transmission may be increased over time. Once the priority of ZIGBEE® transmission is higher than that of the next pending BLE request, the next pending BLE request may not start and leave the RF path open for ZIGBEE® communication. The BLE connection event may restart after the ZIGBEE® communication is completed. The decision of switching between BLE and ZIGBEE® transmissions is made after each RF request event is finished. As a result, there is no interruption of an ongoing RF request and no incomplete transmission.

To enable the radio arbiter's ability to predict and work with pending RF request events several input parameters are defined below.

The "Radio Access Request" message includes a request to use the RF path to the radio arbiter. The radio arbiter hardware may determine if and when such a request may be granted. The following is an exemplary list of input parameters and their descriptions:

The "Request Type" may be classified as a new request, a request update to an on-going RF request (e.g., which may result in stopping RF operation or updating the priority and/or duration for current RF request parameters), and a request update to an on-hold RF request (e.g., which may result in canceling the on-hold request, updating the on-hold request and/or updating next pending RF request parameters).

The "Request Control" may include certain fine control parameters for the RF request. For example, depending on the Request Control parameter, one or more of the following results may occur. In some situations, priority of current request may be modified (e.g., increased) on each unscheduled event if request feedback status is "on-hold." This may primarily be used on 802.15.4 RF requests. In some situations, the priority of next pending request may be modified (e.g., increased) if the request feedback status is "on-hold." This may primarily be used on BLE RF requests. In some situations, a current request may be removed if RF access is not granted. This may primarily be used for BLE request because each BLE request has a strict timing requirement.

The "Current RF Request Base Priority" may be a defined priority order for RF requests of different types.

The "Burst Request" may indicate the intention of burst mode definition to avoid small packet radio thrashing. In some embodiments, the possibility of radio thrashing may be reduced or essentially eliminated.

The "Immediate Flag" may be a parameter for IEEE 802.15.4 to indicate a random back-off and CSMA-CA mechanism. BLE communicates at anchor points with connection interval. Both protocols are not designed as real-time protocols. In addition, an immediate flag may be treated as highest priority to ensure transmission with least latency. The functionality of this flag may be handled by request priority.

The "Time to the Next Pending RF Request" may be used by BLE requests, because subsequent BLE RF requests are predictable. For 802.15.4 working on random access mode, RF requests may not be predictable. Therefore, the radio arbiter may set this parameter to zero for 802.15.4 requests indicating there is no known pending RF request. The time to the next RF request may be tracked by the radio arbiter and decrease with system time.

The "Priority of the Next Pending RF Request" may be used by the radio arbiter to make decision if the pending RF request should prevent 802.15.4 transmission at time $T_A$ (see, e.g., FIGS. 3, 4).

The "Duration of Current RF Request" may be used by the radio arbiter to determine if the current RF request will interfere with the next pending RF request and then make a decision accordingly. Setting this value to zero may indicate an unknown duration, which may be used for initiating Rx operation on 802.15.4. It makes sure that 802.15.4 Rx operation could start immediately without considering interference. The Rx request could be updated with a new duration once an 802.15.4 header is received.

The "Radio Arbiter Feedback Information" may be used by the radio arbiter to provide smooth operation between radio arbiter and the link controllers. Radio Arbiter Feedback Information may be issued at least at one of two situations: 1) when responding to a "Radio Access Request" to the requester, or 2) when transmitting to either link controller with on-hold RF request, after an RF operation is complete and the RF path is available again.

The radio arbiter feedback may either grant RF path access in response to the RF request, or temporally put access on-hold until further notice. Examples of parameters for the radio arbiter feedback are listed below:

The "Updated Status" may include a Boolean flag that indicates if the latest RF request has been granted. If the updated status is granted, the radio arbiter may reserve the RF path for the requesting link controller and the RF operation may start immediately. If the status is on-hold, the respective link controller may update the RF request, such as by increasing its priority level and modifying the next pending RF request data.

The "Current RF Priority" may include the priority level of the RF event that prevents the latest RF request from being granted. This priority level may be either the current on-going RF operation or the next pending RF request. Based on this priority level and updated local priority level, the local protocol module may determine if the on-hold RF request should be updated with a higher priority. This parameter may not affect whether the update status is "granted."

FIG. 5 is a timing diagram 500 showing a maximum transmission delay of a prediction-based arbitration event according to an embodiment of the disclosure. The scenario of FIG. 5 is the same described above with respect to FIG. 4, but now showing the maximum transmission time defined as the difference between $T_D$ and $T_A$. In some embodiments, the ZIGBEE® transmission may have a maximum delay of its transmission time plus two BLE time slots plus silicon turn over time. In an example scenario, to transmit a 127-byte packet with acknowledgement, the maximum delay is about 6.5 milliseconds plus silicon processing time. On the other hand, IEEE 802.15.4 protocol is not designed as real-time low latency communication mechanism. Rather, it is considered a successful transmission with up to 23.95 milliseconds latency under maximum CCA retries and retransmissions. As the comparison, the maximum transmission delay of about 6.5 milliseconds is tolerable under most circumstances.

The BLE transmission could have a maximum delay decided by the connection interval in connected state. In BLE specification design, missing a connection event may be tolerable and the specification defines multiple ways to re-synchronize the connection. Therefore, the maximum delay in BLE should not be a concern in most of the situations.

Figure 6:
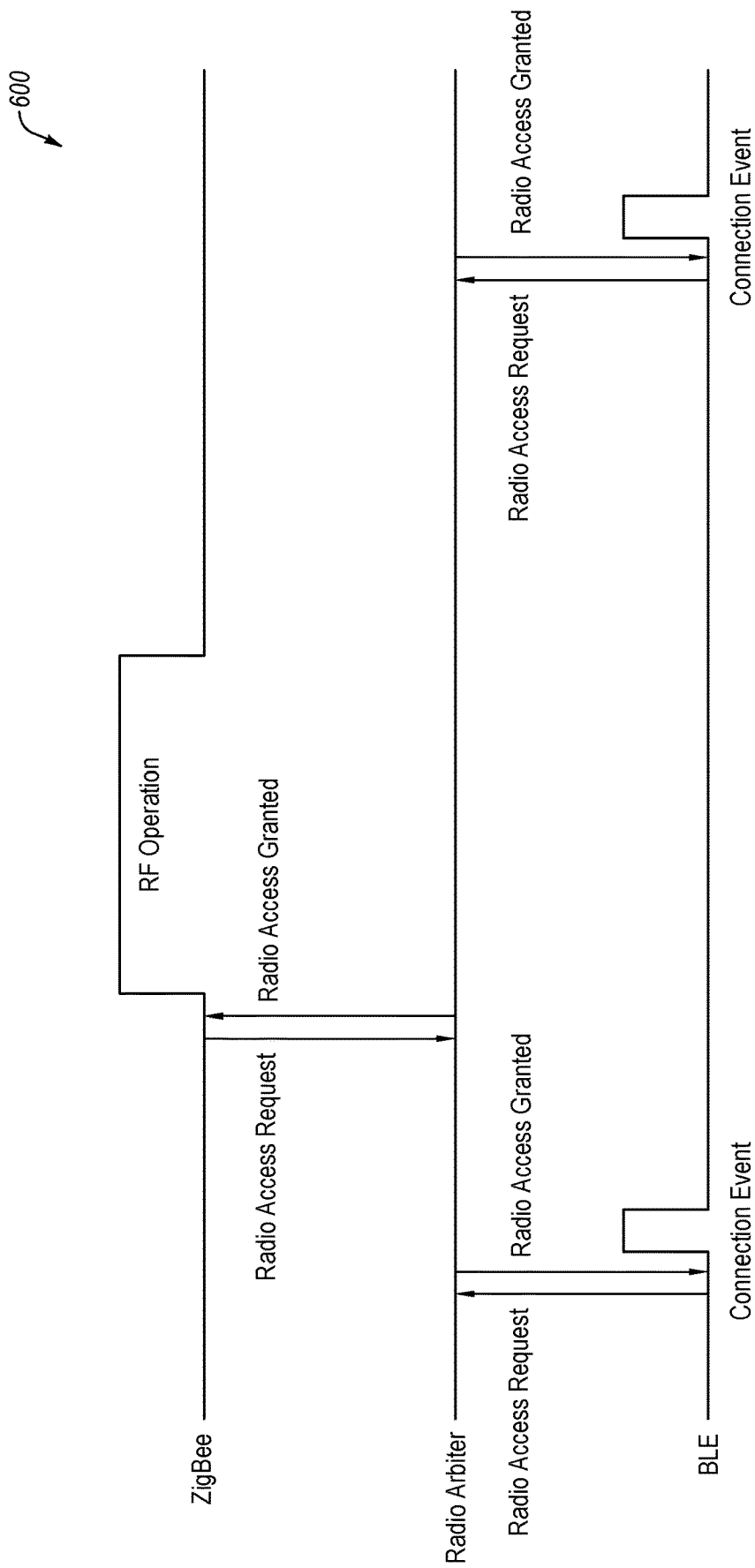
FIG. 6 is a timing diagram showing a radio arbiter operation without predicted collision according to an embodiment of the disclosure.

FIG. 6 is a timing diagram 600 showing a radio arbiter operation without predicted collision according to an embodiment of the disclosure. The radio arbiter receives an RF request for the BLE link controller (i.e., receives a "Radio Access Request" message) and determines that no conflict is predicted to occur with the ZIGBEE® link controller. As a result, the radio arbiter may grant the RF request (i.e., send a "Radio Access Feedback" message). The BLE link controller may then start RF operation. After completion of the BLE transmission, the radio arbiter receives an RF request for the ZIGBEE® link controller (i.e., receives a "Radio Access Request" message) and determines that no conflict is predicted to occur with the RF link controller. As a result, the radio arbiter may grant the RF request (i.e., send a "Radio Access Feedback" message). The ZIGBEE® link controller may then start RF operation.

Figure 7:
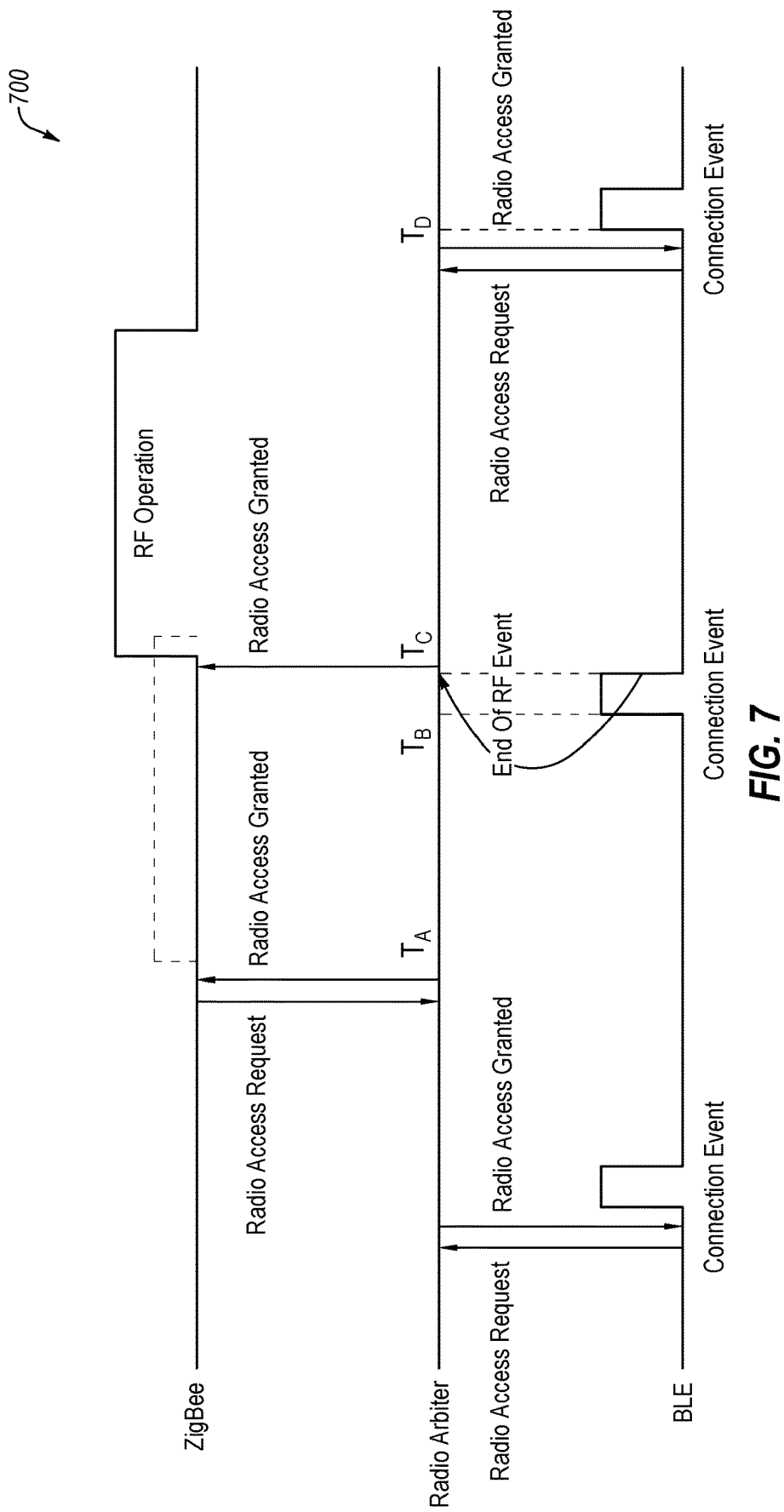
FIGS. 7 through 9 are timing diagrams showing a radio arbiter operation with a predicted transmitter collision for different priority situations according to embodiments of the disclosure.

FIG. 7 is a timing diagram 700 showing a radio arbiter operation with a predicted transmitter collision according to an embodiment of the disclosure. In this example, the BLE communication has priority for the radio arbiter. In this situation, when the ZIGBEE® link controller transmits an RF request (i.e., "Radio Access Request" message) at $T_A$, the radio arbiter predicts that a collision will happen at $T_B$. This prediction may be based on the input parameters of "Current RF Request Duration" and "Next Pending RF Request Time" received in a previous BLE request. Because the BLE operation has higher priority, the radio arbiter does not grant the RF request. Rather, the radio arbiter holds ZIGBEE® transmission by responding with "Radio Access Feedback" with status "on-hold." The radio arbiter waits until the end of higher priority pending RF operation is completed at $T_C$, and then sends a "Radio Access Feedback" message to the ZIGBEE® link controller with the status "granted." The next pending RF request may be a scheduled BLE request at $T_D$, which is not predicted to conflict with the ZIGBEE® transmission.

Figure 8:
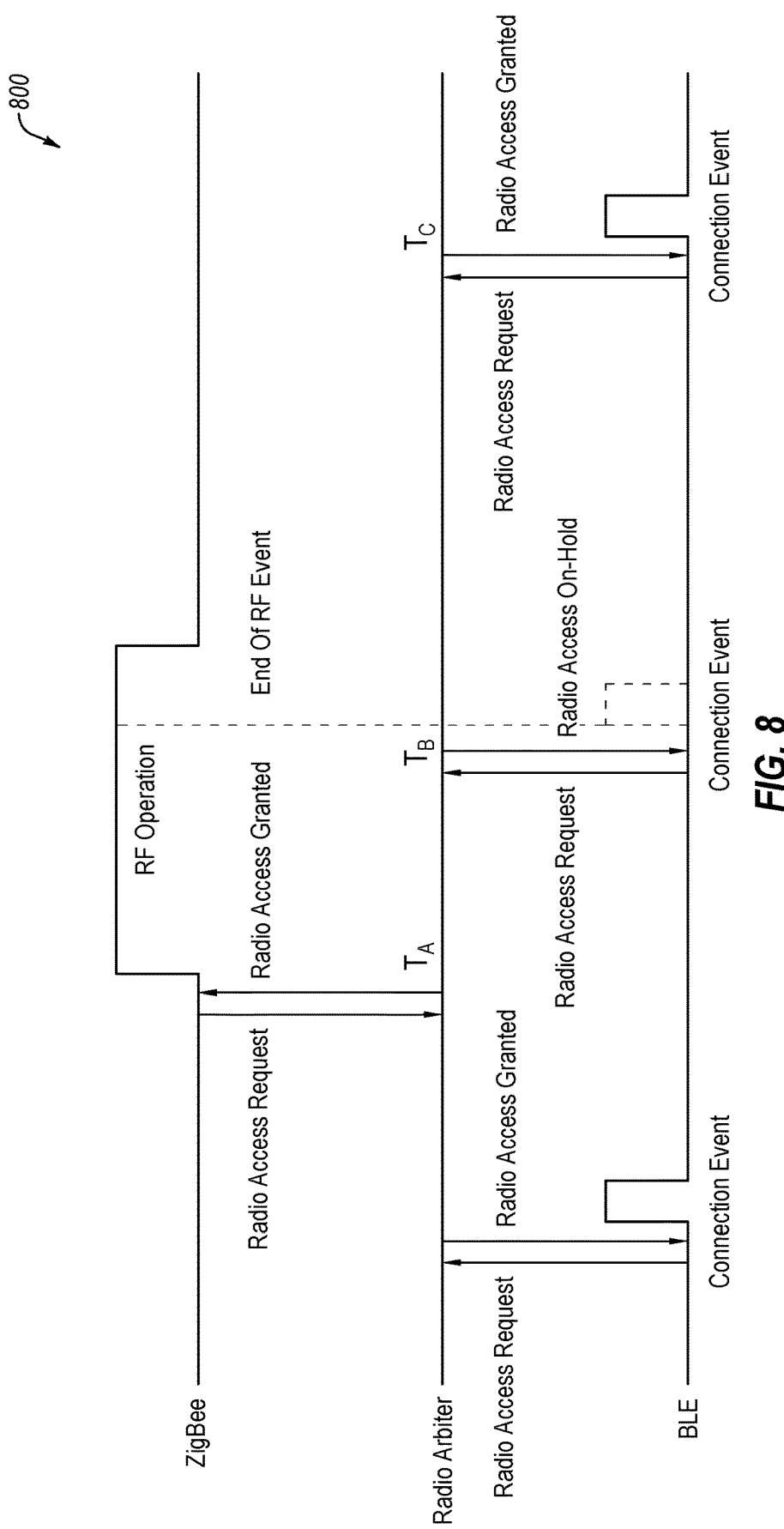

FIG. 8 is a timing diagram 800 showing a radio arbiter operation with a predicted transmitter collision according to an embodiment of the disclosure. In this example, the ZIGBEE® communication has priority for the radio arbiter. In this situation, at $T_A$, the radio arbiter receives an RF request (i.e., "Radio Access Request" message) from the ZIGBEE® link controller. The radio arbiter determines a collision at $T_B$. Because the ZIGBEE® communication has higher priority over the next pending RF request at $T_B$, RF access is granted (i.e., "Radio Access Feedback" message is returned update status "granted"). At time $T_B$, BLE sends the RF request to the radio arbiter. Because BLE communication has lower priority, the radio arbiter holds the BLE RF request. Because BLE operation has timing requirements, the current RF request from BLE is cancelled and the next pending RF request from BLE may optionally increase the priority level relative to the other priority level. Increasing priority on the subsequent BLE RF requests may help to prevent the ZIGBEE® communication from occupying the RF path indefinitely. Of course, increasing the priority is to be understood to be relative to the other priority level. For example, in some embodiments, the priority level of one type of RF request may be increased, while in other embodiments the priority level of the other type of RF request may be decreased. Some embodiments may include increasing the priority of one type of RF request while also decreasing the priority of the other type of RF request. Other methods for interrupting data streaming responsive to a predetermined period of time expiring without servicing the first RF request are also contemplated, such a incorporating a timer that tracks an amount of time that an RF request is on hold and interrupting the data streaming if a pre-determined threshold has been reached.

Figure 9:
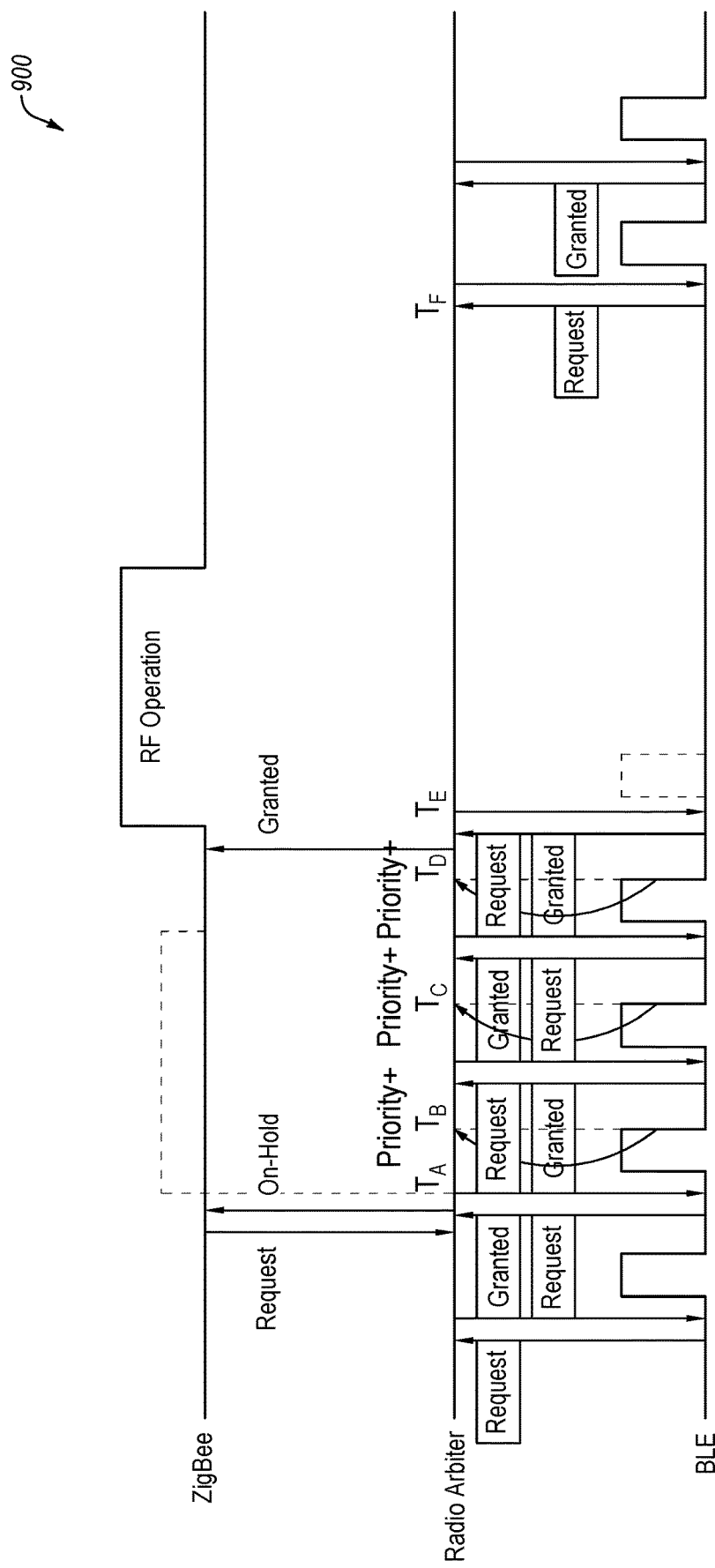

FIG. 9 is a timing diagram 900 showing a radio arbiter operation with a predicted transmitter collision according to an embodiment of the disclosure. In this example, the BLE communication has priority for the radio arbiter, with the priority increasing for the ZIGBEE® communication after being on-hold when streaming data. Originally, the RF request from the ZIGBEE® link controller has a lower priority and is put into an on-hold status while the BLE link controller is streaming data. Whenever an RF operation is finished at $T_B$, $T_C$ and $T_D$ for the BLE communication, the radio arbiter may increase the priority of the on-hold RF request for the ZIGBEE® communication until the on-hold RF request has a higher priority. At $T_D$, the on-hold RF request for ZIGBEE® communication has increased to the point of being greater than the priority of the on-going BLE streaming data RF request. The radio arbiter sends a "Radio Access Feedback" message with "granted" as status to the ZIGBEE® link controller, which then starts to transmit data. When the next streaming RF request from the BLE link controller is issued at $T_E$, the radio arbiter may place BLE communication on-hold. The BLE data streaming may restart after connection interval at $T_F$ when the ZIGBEE® communication is completed, or if the on-hold BLE communication has its priority increased in the event that ZIGBEE® communication does not complete in a timely manner.

Figure 10:
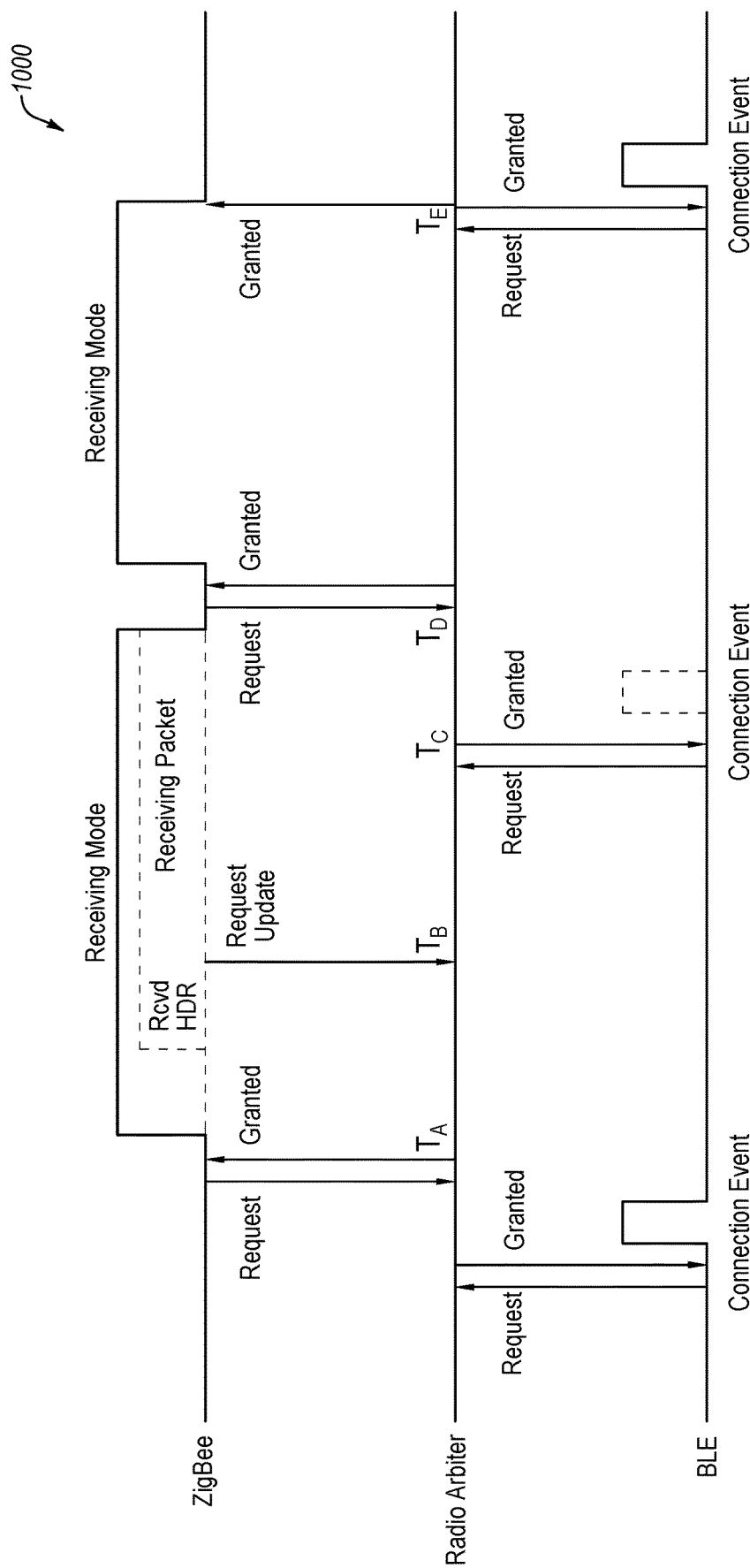
FIGS. 10 and 11 are timing diagrams showing a radio arbiter operation with a predicted receiver collision for different priority situations according to an embodiment of the disclosure.
Figure 11:
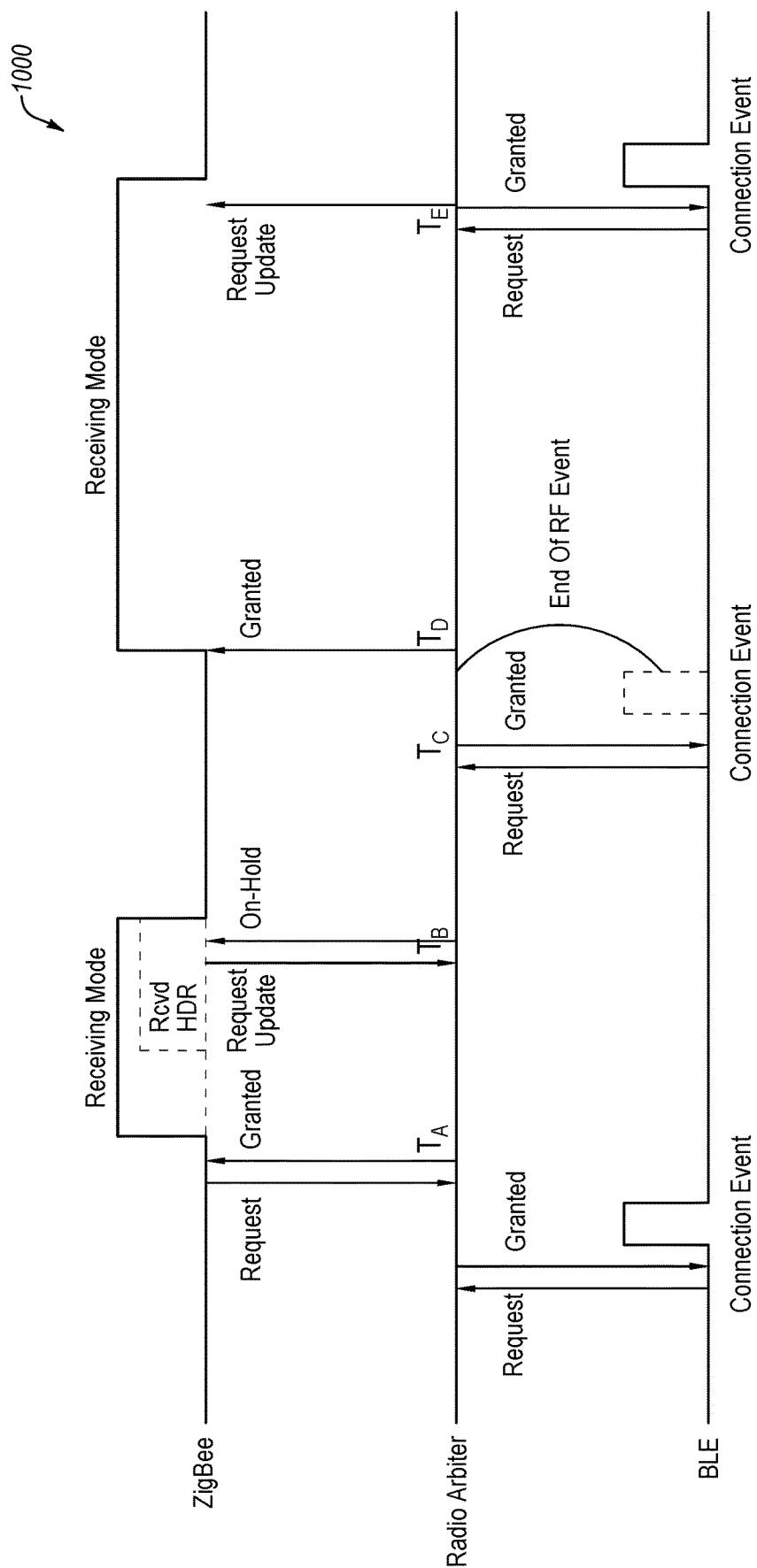

FIGS. 10 and 11 are timing diagrams 1000, 1100 showing a radio arbiter operation with a predicted receiver collision with different priority rankings according to embodiments of the disclosure. As discussed above, the radio arbiter predictability prevents collision of Tx operations between BLE and ZIGBEE® communications. However, the collisions may not be completely prevented for received data because transmission of such data is not in control of the wireless subsystem receiving the data. Nevertheless, receiving data over BLE communications may be handled in a similar way as in transmit mode, as BLE requests are scheduled accurately between two devices. On the other hand, due to the fact that ZIGBEE® communications may operate in random access mode, the timing that the peer sends a message may be unknown. Therefore, pre-scheduling ZIGBEE® communications is generally not possible in many cases.

To enter receive mode, the radio arbiter may receive an RF request. The RF request may include the "duration for current RF request" parameter either specified when the receive operation time is known or the parameter may be unspecified (more common). However, once the 802.15.4 headers of a packet are received, following information may be known by the radio arbiter: 1) the packet length is known from PDU header, 2) the address is known from MAC header to decide if the local device is intended receiver, and 3) whether Acknowledgement is required from the MAC header. Based on this information, the total remaining time period to stay in receive mode in order to receive and optionally acknowledge the packet may be determined. The radio arbiter may then send an update to the current Rx request with a higher priority. With the new information, the radio arbiter compares the duration with the next pending RF request from BLE link controller. If collision is predicted, the radio arbiter then determines if the ZIGBEE® receive operation will have higher priority when the next pending RF request is issued from BLE, then the wireless subsystem will keep operating in ZIGBEE® receive mode. When a BLE RF request is received, the BLE RF request may be placed on-hold. If the radio arbiter determines the ZIGBEE® receive operation will have lower priority when the next pending RF request is issued from BLE, the radio arbiter sends "Radio Access Feedback" message to the ZIGBEE® link controller to cease operating in receive mode and enter into idle mode.

Because the total receiving time for a ZIGBEE® packet may be known after the MAC header is received and parsed, a priority increase may be assigned according to the amount of received data. For example, a priority may be increased one level for every 20% or 10% of packet being received. As a result, it may be easier to abandon receiving a ZIGBEE® packet at an early stage when few resources have been expended, but more difficult to abandon at a late stage when a lot of resources have been expended that would need to be restarted. For the whole complete ZIGBEE® packet receiving process, the radio arbiter may be configured to predict the priority at any time and make decision accordingly.

FIG. 10 is a timing diagram 1000 showing a radio arbiter operation with a predicted receiver collision according to an embodiment of the disclosure. In this example, the ZIGBEE® communication has priority for the radio arbiter over BLE communication. At $T_A$, the ZIGBEE® link controller sends a request to perform Rx operation and it is granted. At $T_B$, the preamble, SDF and headers of a packet are received by ZIGBEE® link controller. The received information indicates that the local device is the intended receiver as well as the total length and acknowledgement requirement for the received packet. At this point, the remaining time to receive the complete packet may be known. A "Radio Access Request" message may then be sent to the radio arbiter to update the current on-going ZIGBEE® Rx operation with higher priority and its expected duration. Based on the expected duration, the radio arbiter predicts (e.g., calculates) that at $T_C$, when the next pending BLE RF request is scheduled to be received, the ZIGBEE® Rx operation will have a higher priority over the scheduled BLE operation. Therefore, the ZIGBEE® Rx operation may continue. The BLE connection event may be put into on-hold status at $T_C$. After the Rx operation of ZIGBEE® packet is completed, a new RF request may be received for Rx mode for ZIGBEE® communications at $T_D$. In some embodiments, the new ZIGBEE® communications may have a lower priority than the BL communication (e.g., BL priority may have been incremented since the last request). As a result, the radio arbiter may interrupt and place on hold the ZIGBEE® communication in favor of a higher priority BLE RF request at $T_E$. Thus, the radio arbiter may not service the ZIGBEE® communication according to its initial parameters because of the predicted collision determined from the initial parameters of the different RF requests.

FIG. 11 is a timing diagram 1100 showing a radio arbiter operation with a predicted receiver collision according to an embodiment of the disclosure. In this example, the BLE communication has priority for the radio arbiter. At $T_A$, the radio arbiter receives an RF request to perform ZIGBEE® Rx operation and the request is granted. At $T_B$, the preamble, SDF and headers of a packet are received by the ZIGBEE® link controller. The received information indicates that the local device is the intended receiver, as well as the total packet length, and acknowledgement requirement for the received packet. At this time, the remaining time to receive the complete packet may be known. A "Radio Access Request" message is then send to the radio arbiter to update the current on-going Rx operation with a higher priority and expected duration. Based on the duration, the radio arbiter determines (e.g., calculates) that at $T_C$, the ZIGBEE® Rx operation will have a lower priority than the next scheduled BLE request. Therefore, if Rx operation continues, the ZIGBEE® communication would be interrupted by the scheduled BLE request. Because ZIGBEE® communication has a lower priority, the radio arbiter may send a "Radio Access Feedback" parameter with an "on-hold" status to place the ZIGBEE® link controller into idle mode. As expected, at $T_C$, the BLE link controller issues the RF request and grants access. At the end of the BLE communication at $T_D$, the radio arbiter sends a "Radio Access Feedback" message to the ZIGBEE® link controller to continue general Rx operation.

Additional non-limiting embodiments include:

Embodiment 1

A radio arbiter, comprising: a processor; and a computer-readable medium including instructions stored thereon that, when executed by the processor, cause the processor to: receive a first RF request associated with a first wireless protocol; receive a second RF request associated with a second wireless protocol; and place the first RF request on hold until after the second RF request is completed based on a predictive arbitration determination before receiving the second RF request.

Embodiment 2

The radio arbiter of Embodiment 1, wherein the first wireless protocol and the second wireless protocol includes at least one of Bluetooth® Low Energy, ZIGBEE®, or Wi-Fi.

Embodiment 3

The radio arbiter of Embodiment 1, wherein the instructions, when executed by the processor, cause the processor to place the first RF request on hold by servicing the first RF request in a manner different than its initial parameters.

Embodiment 4

The radio arbiter of Embodiment 3, wherein the instructions, when executed by the processor, further cause the processor to serve the second RF request according to its initial parameters.

Embodiment 5

The radio arbiter of Embodiment 1, wherein the wherein the instructions, when executed by the processor, further cause the processor to: receive the first RF request; determine that the first RF request will collide with the second RF request according to initial parameters of either the first RF request or the second RF request; and begin service of the first RF request after service of the second RF request has cleared.

Embodiment 6

The radio arbiter of Embodiment 5, wherein the initial parameters include at least one of an RF request type, an expected duration of the RF request, a request priority, an amount of time until the next RF request, or a combination thereof.

Embodiment 7

The radio arbiter of Embodiment 6, wherein the expected duration of the first RF request is dependent upon a size of transmitting packets, and the expected duration of the second RF request is fixed.

Embodiment 8

An electronic system, comprising: a wireless subsystem including: a radio module; a plurality of link controllers configured according to two or more different topologies; a radio arbiter configured to: transmit and receive data between the radio module and the plurality of link controllers; and place a first RF request on hold until after a second RF request is completed based on a predictive arbitration determination before receiving the second RF request.

Embodiment 9

The electronic system of Embodiment 8, wherein the plurality of different topologies includes a first topology and a second topology that are low power, low rate topologies.

Embodiment 10

The electronic system of Embodiment 9, wherein the first topology is Bluetooth® Low Energy and the second topology is configured to operate according to 802.15.4 technical standard.

Embodiment 11

The electronic system of Embodiment 9, wherein the second topology is selected from the group consisting of ZIGBEE®, ISA100.11a, WirelessHART, WiWi, SNAP, and Thread specifications.

Embodiment 12

The electronic system of Embodiment 8, wherein the at least one of the two or more different topologies include Wi-Fi.

Embodiment 13

The electronic system of Embodiment 8, wherein the electronic system includes a device incorporating the wireless subsystem selected from the group consisting of a home automation device, a medical device, a smartphone, a gaming console, a personal computer, a laptop computer, a tablet computer, an automotive device, an audio system, a video system, and a peripheral device.

Embodiment 14

A method of wireless communication, the method comprising: receiving a first RF request through a radio module having a first priority; receiving a second RF request through the radio module having a second priority higher than the first priority; and placing the first RF request on hold responsive to determining that granting the first RF request would result in a collision with the second RF request.

Embodiment 15

The method of Embodiment 14, further comprising increasing the first priority to be greater than the second priority during data streaming associated with the second RF request.

Embodiment 16

The method of Embodiment 14, wherein placing the first RF request on hold includes skipping the first RF request.

Embodiment 17

The method of Embodiment 14, further comprising increasing a priority level of the first priority relative to the second priority while the first RF request have been on hold for a pre-determined period of time.

Embodiment 18

The method of Embodiment 17, wherein increasing the priority level of the first priority relative to the second priority is performed periodically until the first priority is greater than the second priority.

Embodiment 19

The method of Embodiment 18, further comprising servicing the first priority request responsive to the first priority achieving a priority level that is greater than the second priority.

Embodiment 20

The method of Embodiment 14, further comprising interrupting data streaming according to the second RF request responsive to a predetermined period of time expiring without servicing the first RF request.

Embodiment 21

The method of Embodiment 14, further comprising: receiving a third RF request through a radio module having a third priority having a higher priority than the first priority and the second priority; and placing the first RF request and/or the second RF request on hold responsive to determining that granting the first RF request and/or the second RF request would result in a collision of the third RF request with the first RF request and/or the second RF request.

Embodiment 22

A method of scheduling communication involving at least two wireless protocol types, the method comprising: receiving a first RF request of a first type and a second RF request of a second type; predicting a collision between the first RF request and the second RF request based on one or more parameters of the requests; scheduling grant of the first RF request and the second RF request based on a priority level to avoid the predicted collision.

Embodiment 23

The method of Embodiment 22, further comprising adjusting the priority levels of the different types of RF requests.

Embodiment 24

The method of Embodiment 23, wherein adjusting the priority levels of the different types of RF requests includes increasing the priority level of the first type of RF request.

Embodiment 25

The method of Embodiment 23, wherein adjusting the priority levels of the different types of RF requests includes decreasing the priority level of the first type of RF request.

Embodiment 26

The method of Embodiment 23, wherein adjusting the priority levels of the different types of RF requests includes increasing the priority level of the second type of RF request.

Embodiment 27

The method of Embodiment 23, wherein adjusting the priority levels of the different types of RF requests includes decreasing the priority level of the second type of RF request.

Embodiment 28

The method of Embodiment 23, wherein adjusting the priority levels of the different types of RF requests includes increasing the priority level of the first type of RF request and decreasing the priority level of the second type of RF request.

Embodiment 29

The method of Embodiment 23, wherein at least one of the first type of RF request or the second type of RF request is a Bluetooth® request.

Embodiment 30

The method of Embodiment 29, wherein the Bluetooth® request is a Bluetooth® Low Energy (BLE) request.

Embodiment 31

The method of Embodiment 23, wherein at least one of the first type of RF request or the second type of RF request is a ZIGBEE® request.

Embodiment 32

The method of Embodiment 23, wherein at least one of the first type of RF request or the second type of RF request is a Wi-Fi request.

Embodiment 33

The method of Embodiment 23, wherein at least one of the first type of RF request or the second type of RF request is a Wi-Fi request.

Embodiment 34

A scheduler for resolving a conflict between RF requests to a communication device, the scheduler configured to: receive a first RF request of a first type and a second RF request of a second type; predict a collision between the first RF request and the second RF request based on one or more parameters of the requests; schedule grant of the first RF request and the second RF request based on a priority level to avoid the predicted collision.

Embodiment 35

The scheduler of Embodiment 34, further comprising a radio arbiter configured to receive the first RF request and the second RF request and perform the prediction.

Embodiment 36

The scheduler of Embodiment 34, wherein the one or more parameters includes an expected duration of servicing the first RF request and the second RF request.

Embodiment 37

The scheduler of Embodiment 34, wherein the one or more parameters include at least one of an RF request type, an expected duration of a current RF request, time to next pending RF request, a priority of the next pending RF request, or any combination thereof.

Embodiment 38

The scheduler of Embodiment 34, wherein the expected duration of the current RF request is a fixed duration.

Embodiment 39

The scheduler of Embodiment 34, wherein the expected duration of the current RF request is of a variable duration.

Embodiment 40

The scheduler of Embodiment 39, wherein the variable duration depends on a size of transmitting packets.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventors.

What is claimed is:

1. A radio arbiter, comprising:
   a processor; and
   a computer-readable medium including instructions stored thereon that, when executed by the processor, cause the processor to:
   receive a first radio frequency (RF) request associated with a first wireless protocol;
   receive a second RF request associated with a second wireless protocol, the second RF request comprising a connection event to maintain a wireless connection, the second RF request further having an associated predicted connection interval following a previous connection event; and
   place the first RF request on hold until after the second RF request is completed, based on a predictive arbitration determination before receiving the second RF request.

2. The radio arbiter of claim 1, wherein the first wireless protocol and the second wireless protocol include at least one of Bluetooth® Low Energy, ZIGBEE®, or Wi-Fi.

3. The radio arbiter of claim 1, wherein the instructions, when executed by the processor, cause the processor to place the first RF request on hold by servicing the first RF request in a manner different than its initial parameters.

4. The radio arbiter of claim 3, wherein the instructions, when executed by the processor, further cause the processor to serve the second RF request according to its initial parameters.

5. The radio arbiter of claim 1, wherein the instructions, when executed by the processor, further cause the processor to:
   receive the first RF request;
   determine that the first RF request will collide with the second RF request according to initial parameters of either the first RF request or the second RF request; and
   begin service of the first RF request after service of the second RF request has cleared.

6. The radio arbiter of claim 5, wherein the initial parameters include at least one of an RF request type, an expected duration of the RF request, a request priority, an amount of time until the next RF request, or a combination thereof.

7. The radio arbiter of claim 6, wherein the expected duration of the first RF request is dependent upon a size of transmitting packets, and the expected duration of the second RF request is fixed.

8. An electronic system, comprising:
   a wireless subsystem including:
   a radio frequency (RF) radio;
   a plurality of link controllers configured according to two or more different topologies; and
   a processor and a memory having instructions stored thereon, wherein when the processor executes the instructions the processor is configured as a radio arbiter configured to:
   transmit and receive data between the RF radio and the plurality of link controllers; and
   place a first RF request associated with a first topology on hold until after a second RF request associated with a second topology is completed based on a predictive arbitration determination before receiving the second RF request, the second RF request comprising a connection event to maintain a wireless connection, the second RF request received a predicted connection interval following a previous connection event.

9. The electronic system of claim 8, wherein the plurality of different topologies includes the first topology and the second topology that are low power, low rate topologies.

10. The electronic system of claim 9, wherein the first topology is Bluetooth® Low Energy and the second topology is configured to operate according to 802.15.4 technical standard.

11. The electronic system of claim 9, wherein the second topology is selected from the group consisting of ZIGBEE®, ISA100.11a, WirelessHART, Wi-Fi, subnet access protocol (SNAP), and Thread specifications.

12. The electronic system of claim 8, wherein the at least one of the two or more different topologies include Wi-Fi.

13. The electronic system of claim 8, wherein the electronic system includes a device incorporating the wireless subsystem selected from the group consisting of a home automation device, a medical device, a smartphone, a gaming console, a personal computer, a laptop computer, a tablet computer, an automotive device, an audio system, a video system, and a peripheral device.

14. A method of wireless communication, the method comprising:
   receiving a first radio frequency (RF) request associated with a first wireless protocol;
   associating a first priority with the first RF request;
   receiving a second RF request associated with a second wireless protocol;
   associating a second priority with the second RF request, the second priority higher than the first priority; and
   placing the first RF request on hold prior to receiving the second RF request responsive to predictively determining that granting the first RF request would result in a collision with the second RF request;
   wherein receiving the second RF request comprises receiving a connection event to maintain a wireless connection according to the second wireless protocol a predicted connection time interval following a previous connection event.

15. The method of claim 14, further comprising increasing the first priority to be greater than the second priority during data streaming associated with the second RF request.

16. The method of claim 14, wherein placing the first RF request on hold includes skipping the first RF request.

17. The method of claim 14, wherein increasing the priority level of the first priority relative to the second priority is performed periodically until the first priority is greater than the second priority.

18. The method of claim 14, further comprising servicing the first priority request responsive to the first priority achieving a priority level that is greater than the second priority.

19. The method of claim 14, further comprising interrupting data streaming according to the second RF request responsive to a predetermined period of time expiring without servicing the first RF request.

20. The method of claim 14, further comprising:
receiving a third RF request;
associating a third priority with the third RF request, the third priority higher priority than the first priority and the second priority; and
placing the first RF request and/or the second RF request on hold responsive to determining that granting the first RF request and/or the second RF request would result in a collision of the third RF request with the first RF request and/or the second RF request.

* * * * *